(12) United States Patent
Lumma

(10) Patent No.: US 6,236,711 B1
(45) Date of Patent: May 22, 2001

(54) RADIATION MEASURING DEVICE COMPRISING AN IONIZATION CHAMBER

(75) Inventor: Waldemar Lumma, Hamburg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/270,442

(22) Filed: Mar. 16, 1999

(30) Foreign Application Priority Data

Mar. 17, 1998 (DE) ............................................. 198 11 556

(51) Int. Cl.[7] .............................. H01J 47/02; A61B 6/00; G01T 1/185
(52) U.S. Cl. ........................................... 378/97; 250/385.1
(58) Field of Search ................... 378/97, 62; 250/385.1

(56) References Cited

U.S. PATENT DOCUMENTS

| | | | |
|---|---|---|---|
| 3,988,584 | * 10/1976 | Lange et al. | 378/28 |
| 4,230,944 | * 10/1980 | Wiegman et al. | 378/97 |
| 5,264,701 | * 11/1993 | Crain | 250/385.1 |

FOREIGN PATENT DOCUMENTS

| | | | |
|---|---|---|---|
| 1082989 | 11/1960 | (DE) . | |
| 0562762A1 | 9/1993 | (EP) | H01J/47/02 |
| 0123456 A2 | * 1/2000 | (EP) | 100/100 |

* cited by examiner

Primary Examiner—Robert H. Kim
Assistant Examiner—Drew A. Dunn
(74) Attorney, Agent, or Firm—John F. Vodopia

(57) ABSTRACT

The invention relates to an ionization chamber which includes a plurality of measuring field electrodes (131 . . . 133) which are arranged on a substrate (120) at a distance from one another and are provided with supply leads (134), and at least one electrode (180) which is arranged at a distance from and faces the substrate and emits charge carriers under the influence of X-rays. An insulating layer (140; 190) provided on the supply leads and/or on the electrode, at least at the area of the supply leads, prevents the signals from the ionization chamber from being falsified by the charge carriers incident on the supply leads. The electrically insulating (layers) have such a high X-ray transparency that they are practically not reproduced in an X-ray image.

12 Claims, 2 Drawing Sheets

RADIATION MEASURING DEVICE COMPRISING AN IONIZATION CHAMBER

BACKGROUND OF THE INVENTION

1. Field of the Invention

The invention relates to an ionization chamber which comprises a plurality of measuring field electrodes which are arranged on a substrate at a distance from one another and are provided with supply leads, and also at least one electrode which is arranged at a distance from and faces the substrate and emits charge carriers under the influence of X-rays.

2. Description of Related Art

Ionization chambers of this kind are known from EP-A 562 762 and from DE-PS 1 082 989 and are used in an X-ray system so as to switch off the X-rays after a given dose has been reached during an X-ray exposure. They are arranged between an X-ray image detector and the patient to be examined, so that it is important that the ionization chamber absorbs a minimum amount of X-rays and that the spatial absorption differences within the ionization chamber are as small as possible so as to avoid reproduction of the ionization chamber.

The space between the substrate and the electrode in the ionization chamber according to EP-A 562 762 is filled with a foam insert which has a thickness of several millimeters and is provided with windows only at the area of the measuring field electrodes, so that an air volume is present in the zone between a measuring field electrode and the facing part of the electrode. Therefore, charge carriers from the electrode can reach the measuring field electrode only at the area of the windows.

The foam insert serves to prevent the supply leads for the measuring field electrodes from being struck by charge carriers during an X-ray exposure, as otherwise the measurement would be falsified as in the ionization chamber disclosed in DE-PS 1 082 989. Moreover, the foam insert enhances the mechanical stability of the ionization chamber. The absorption of X-rays by the foam insert is greater than that of the air at the area of the measuring field electrodes, even when the foam insert has a small thickness only. In the case of soft X-rays, i.e. in the case of low voltages (for example, 40 kV) applied to the X-ray tube generating the X-rays, such a difference in absorption may cause reproduction of the ionization chamber in the X-ray image; therefore, conventional Bucky exposures are often performed without an automatic exposure control system or without an ionization chamber.

Contemporary X-ray image converters, comprising electrically readable sensors (digital image detectors), moreover, are capable of reproducing absorption differences in the X-ray image which are much smaller than those reproduced by systems used thus far which utilize an X-ray film in combination with an intensifier foil. The risk of reproduction of the ionization chamber is then particularly high.

SUMMARY OF THE INVENTION

Therefore, it is an object of the present invention to construct an ionization chamber of the kind set forth in such a manner that on the one hand its reproduction in an X-ray image is precluded to a high degree and that on the other hand the supply leads to the measuring field electrodes do not influence the signals supplied by the ionization chamber. This object is achieved according to the invention in that an electrically insulating layer is provided on the side of the supply leads facing the electrode and/or on the side of the electrode facing the measuring field electrodes, the thickness of said insulating layer being small in comparison with the distance between the substrate and the electrode.

Providing an electrically insulating layer on the electrode, at least at the area of the supply leads but preferably on the entire electrode with the exception of the regions facing the measuring field electrodes, prevents charge carriers which are generated in the electrode and constitute the essential part of the ionization current from being emitted outside the region of the measuring field electrodes. A layer provided on the supply leads, moreover, prevents charge carriers generated at the area of the supply leads, for example in the air volume over said leads, from reaching the supply leads. Such insulating layers can be constructed to be so thin that they are practically not reproduced in the X-ray image.

The measuring field electrodes themselves will not be reproduced in the X-ray image when they comprise a layer of conductive lacquer preferably containing graphite.

The absorption of the X-rays by the spatially homogeneous electrode does not lead to its reproduction in the X-ray image (the ionization chamber is larger than the X-ray image detector), but decreases the radiation load for the patient in proportion to the part of the X-rays absorbed by the electrode. Use of an electrode including a homogenous layer containing a metal with an atomic number of at least 40; can achieve a low absorption by using a suitable substrate and a thin electrode layer. Because the layer contains a metal having an atomic number of at least 40, charge carriers are emitted thereby under the influence of X-rays for as long as the electrode is not covered by an electrically insulating layer. Having the outer side of the substrates provided with a conductive layer preferably containing graphite ensures electrical shielding of the ionization chamber when the substrates are made of an electrically insulating material.

Adequate mechanical stability is achieved for the ionization chamber by interconnecting the substrates by way of frames.

The risk of reproduction of the measuring fields in the X-ray image is reduced further by providing and insulating lay er on the electrode having opening whose dimensions deviate slightly from those of the measuring field electrodes.

This invention also includes an X-ray system comprising an X-ray tube, an X-ray generator, an X-ray detector, and an automatic exposure control device including an ionization chamber according to the invention.

BRIEF DESCRIPTION OF THE DRAWING

The invention will be described in detail hereinafter with reference to the drawing. Therein.

DETAILED DESCRIPTION OF THE PREFERRED EMBODIMENT

Figure 1:
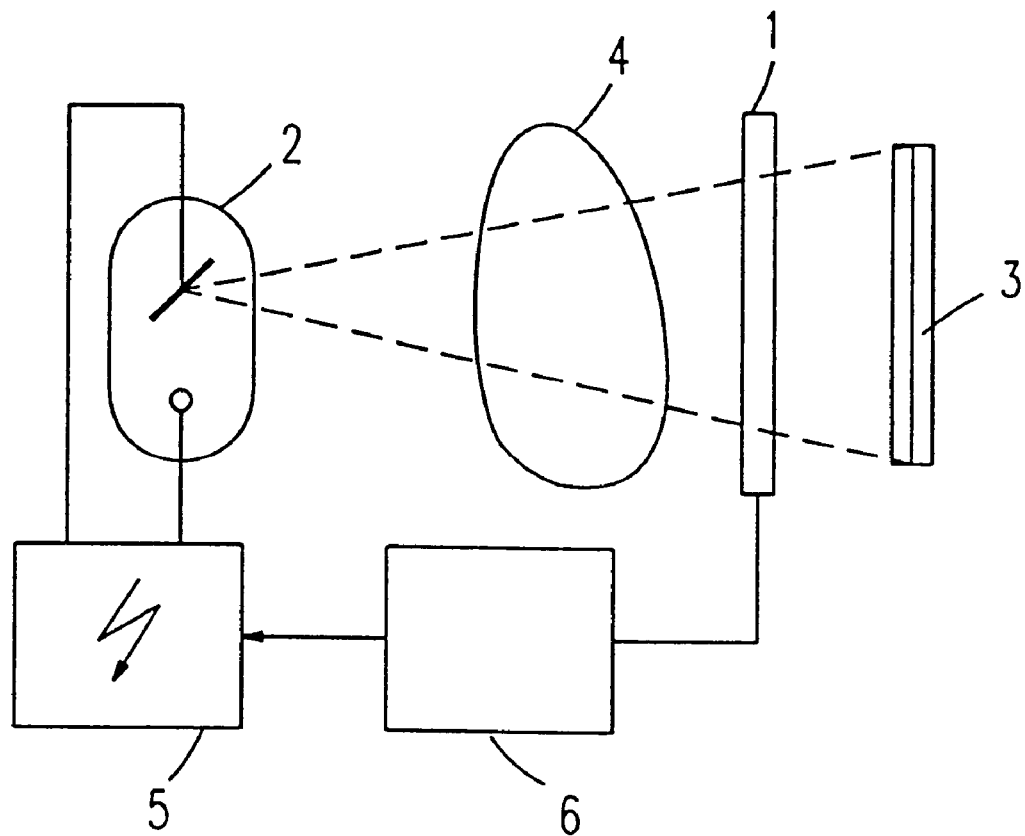
FIG. 1 shows an X-ray system in which the invention can be carried out.

The reference numeral 1 in FIG. 1 denotes an ionization chamber which is arranged between an X-ray source 2 and an X-ray image detector 3 or between a patient 4 to be examined and the X-ray image detector 3. The ionization chamber 1 is larger than the image detector 3, so that its outer contours cannot be imaged on the X-ray image detector. It comprises a plurality of measuring fields in which the X-ray dose is measured and one (or more) of which can be selected for the dose measurement.

The X-ray source 2 is fed by an X-ray generator which comprises a high-voltage generator 5 and a control unit 6. During an X-ray exposure, the ionization currents generated by the X-ray flow across the associated measuring field electrode in the previously selected measuring field of the ionization chamber 1. These ionization currents are integrated by the control unit 6 and ensure that the X-ray exposure is automatically terminated when a given integral value is reached, i.e. a given dose in the selected measuring field.

Figure 2A:
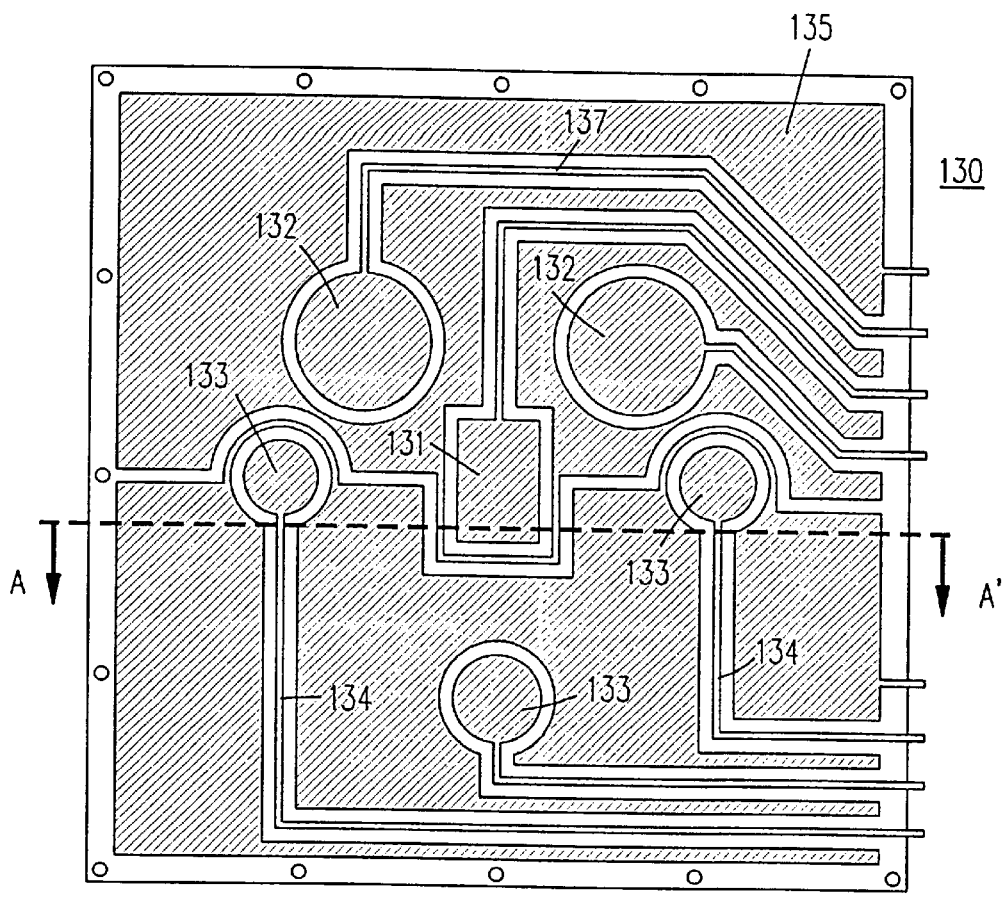
FIG. 2A is a plan view of the measuring field electrodes arranged on a substrate.

The construction of the ionization chambers will be described in detail hereinafter with reference to the FIGS. 2A and 2B; it is to be noted that FIG. 2B does not show the construction of the chamber at the correct scale. The ionization chamber consists of a flat housing with plane, square side walls, one of which supports the measuring field electrodes whereas the other supports the large-area electrode which carries a negative potential with respect to the measuring field electrodes in the operating condition, so that the electrons released in the electrode by the X-rays can reach the measuring field electrodes.

Figure 2B:
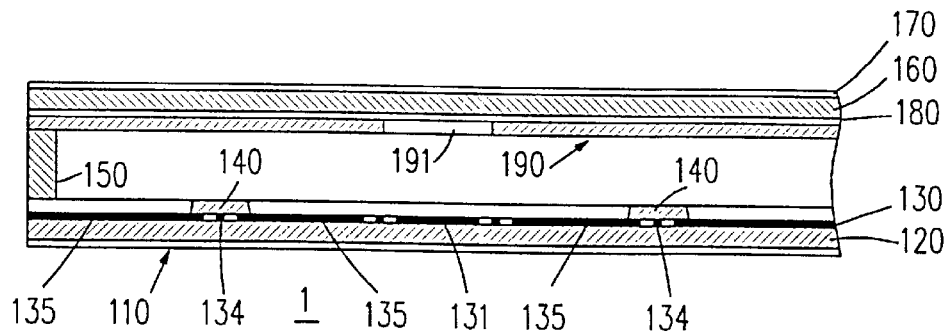
FIG. 2B is a cross-sectional view of an ionization chamber according to the invention.

As appears from FIG. 2B, the lower wall of the ionization chamber housing comprises a substrate 120 of an insulating material, for example a plexiglass plate having a thickness of from 1 to 2 mm. The outer side of the substrate 120 is provided with a thin, conductive layer 110, for example a graphite layer, which can be formed by deposition of a conductive lacquer with a thickness of, for example 0.01 mm by means of a screen printing method. It electrically insulates the ionization chamber from the environment.

The measuring field electrodes are provided in a layer 130 on the inner side of the substrate 120. As appears from FIG. 2A, showing the layer 130, there are provided a central measuring field with a measuring field electrode 131, two measuring fields which are situated above the horizontal central line, symmetrically with respect to the vertical central line (for example for chest exposures) which comprise measuring field electrodes 132, and three smaller measuring fields which are 90° offset relative to one another about the center (for example, for extremity exposures} and each of which comprises a measuring field electrode 133. Each measuring field electrode is connected, via a supply lead 134 provided on the substrate, to a respective integrator circuit which is provided in the control unit and has a high-ohmic input so as to integrate the ionization currents flowing to the measuring field electrodes. The supply leads, having a width of approximately 3 mm, and the measuring field electrodes 131 . . . 133 are enclosed by a grounded drain electrode 135 which is situated at a distance of approximately 6 mm therefrom. The electrically conductive layer 130, consisting of the components 131 . . . 135, is a layer having a thickness of approximately 0.01 mm, like the layer 110, which is formed by deposition of a conductive lacquer layer, containing graphite, by means of a screen printing process. The lines of sight A–A' in FIG. 2A define the plane whose cross-section is shown in FIG. 2B.

At the area of the supply leads 134 the layer 130 is provided with an insulating layer 140 which covers the supply leads and the intermediate spaces to the grounded drain electrode 135. The layer is formed by deposition of an insulating lacquer having a high X-ray transparency (or low X-ray absorption). It has a thickness of from 5 to 6 µm. The layer may also be larger; however, it is important that it does not cover the measuring field electrodes.

The second chamber wall comprises a substrate 160 of the same material and the same thickness as the substrate 120. The outer side of this substrate is provided with a conductive layer 170 which has the same function as the layer 110 and is formed in the same way. On the inner side of the substrate there is provided a locally uniform, electrically conductive layer 180 which contains a metal having an atomic number amounting to at least 40, for example silver or lead. The layer 180 can be formed by printing on the substrate, for example using a silver emulsion of the type "Electrodog 1415 M" from Acheson, 89160 Dornstadt Del. The layer 180 has a thickness of from 5 to 6 µm which suffices to generate an adequate number of free electrons under the influence of X-rays, but is thin enough to cause only a slight overall attenuation of the X-rays.

On the electrode layer 180 there is provided, in the same way as and using the same material as for the layer 140, an insulating layer 190 which is provided with openings 191 in the region facing the measuring field electrodes, the charge carriers generated in the electrode in this region can emerge through said openings and reach, after charge carrier multiplication in the intermediate air space, the oppositely situated measuring field electrode. These openings may have the same dimensions as the facing measuring field electrodes, or dimensions which slightly deviate therefrom, for example slightly smaller dimensions.

The insulating layers 190, 140 effectively ensure that charge carriers are not emitted by the electrode 180 at the area of the supply leads or that they cannot strike or be incident on the supply leads 134. The X-ray transparency of these insulating layers is so high that reproduction of the pattern formed by the layers in the X-ray image is practically precluded. It is a further advantage of the measuring chamber according to the invention that it can be so simply manufactured (multiple printing of substrates with conductive and insulating layers, so that the cost of manufacture of such an ionization chamber is substantially reduced.

If one of the insulating layers were to be omitted, a usable ionization chamber could still be obtained. However, better results are obtained when both layers are used, because they prevent on the one hand the emission of charge carriers from the electrode 80 and on the other hand the incidence of charge carriers on the supply leads.

The described embodiment of an ionization chamber includes merely one electrode and the substrate for the measuring field electrodes constitutes one of the side walls for the ionization chamber. However, like in the ionization chamber according to DE OS 1 082 983, it is also possible to provide an ionization chamber with two electrodes which are arranged to both sides of the auxiliary electrode and constitute the side walls of the chamber in conjunction with the substrates on which they are provided. The measuring field electrodes should then be provided to both sides of a thin substrate situated halfway between the two electrodes.

All references cited herein are incorporated herein by reference in their entirety and for all purposes to the same extent as if each individual publication or patent or patent application was specifically and individually indicates to by incorporated by reference in its entirety for all purposes.

What is claimed is:

1. An ionization chamber comprising:
   a plurality of measuring field electrodes which are arranged on a substrate at a distance from one another and are provided with supply leads, and
   at least one electrode which is arranged at a distance from and faces the substrate and emits charge carriers under the influence of X-rays, and an electrically insulating layer on the side of the supply leads facing the electrode or on the side of the electrode facing the measuring field electrodes, the thickness of said insulating layer being small in comparison with the distance between the substrate and the electrode.

2. An ionization chamber as claimed in claim 1 wherein the measuring field electrodes comprise a layer of a conductive lacquer which is provided on the substrate.

3. An ionization chamber as claimed in claim 1 wherein the electrode includes a homogeneous layer which is provided on a further substrate and contains a metal having an atomic number at least equal to 40.

4. An ionization chamber as claimed in claim 3 wherein the outer sides of the substrates are provided with conductive layers.

5. An ionization chamber as claimed in claim 3 further comprising frames for interconnecting the substrates.

6. An ionization chamber as claimed in claim 1, wherein the insulating layer on the electrode is provided with openings at areas facing the measuring field electrodes whose dimensions deviate from those of the measuring field electrodes.

7. The ionization chamber of claim 1 wherein the electrically insulating layer is provided on the side of the supply leads facing the electrode and on the side of the electrode facing the measuring field electrodes.

8. The ionization chamber of claim 2 wherein the layer of a conductive lacquer further comprises graphite.

9. The ionization chamber of claim 4 wherein the conductive layers on the outer sides of the substrates further comprise graphite.

10. The ionization chamber of claim 6 wherein the openings of the insulating layer on the electrode have dimensions that are the same or smaller than those of the measuring field electrodes.

11. An X-ray system comprising an X-ray image detector, an X-ray tube, an X-ray generator for feeding the X-ray tube, and an automatic exposure control device for terminating an X-ray exposure after a selectable dose has been reached, comprising an ionization chamber which serves to measure the dose and further comprises a plurality of measuring field electrodes which are arranged on a substrate at a distance from one another and are provided with supply leads, and at least one electrode which is arranged at a distance from and faces the substrate and emits charge carriers under the influence of X-rays, and an electrically insulating layer on the side of the supply leads facing the electrode or on the side of the electrode facing the measuring field electrodes, the thickness of said insulating layer being small in comparison with the distance between the substrate and the electrode.

12. The system of claim 11 wherein the electrically insulating layer of the ionization chamber is provided on the side of the supply leads facing the electrode and on the side of the electrode facing the measuring field electrodes.

* * * * *